April 23, 1940.                H. O. PETERSON                2,198,226
                          BALANCED DIODE CIRCUIT
                            Filed Feb. 24, 1938

INVENTOR
H. O. PETERSON
BY
ATTORNEY

Patented Apr. 23, 1940

2,198,226

UNITED STATES PATENT OFFICE 2,198,226

BALANCED DIODE CIRCUIT

Harold O. Peterson, Riverhead, N. Y., assignor to Radio Corporation of America, a corporation of Delaware Application February 24, 1938, Serial No. 192,319

5 Claims. (Cl. 250—27)

Diode rectifiers have been used quite extensively in the radio art and allied arts as detectors and receivers and in vacuum tube voltmeters. Generally, however, in the vacuum tube voltmeter circuit for example, it is found that with zero or substantially zero input alternating current voltage, a small amount of current still flows from the plate of the diode to the cathode of the diode due to the velocity with which electrons are emitted from the cathode. Heretofore it has been customary to balance out this residual direct current by means of a bucking voltage supplied either from a battery or from some other power supply.

This invention is an improvement over this known practice in that the opposing current or voltage is supplied by another identical diode connected so that its residual current will be in the opposite direction from that of the diode rectifier which is used to rectify the alternating current input.

Figure 1:
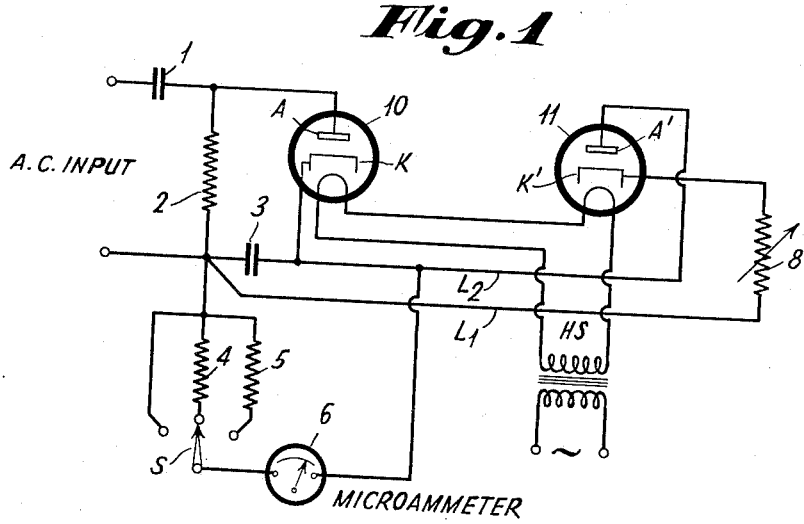
Figure 3:
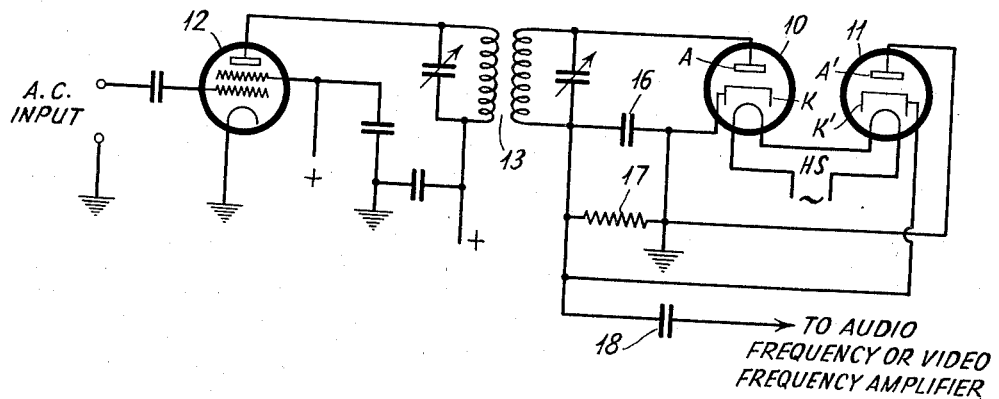
Figure 2:
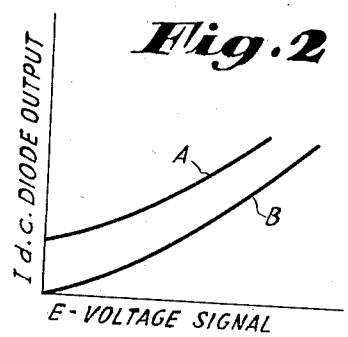

In describing my invention more in detail reference will be made to the attached drawing wherein, Figures 1 and 3 are circuit diagrams including the essential elements of a diode rectifier system having its output connected with indicating means with an additional diode rectifier connected with said indicating means to supply thereto current or voltage for opposing the residual current produced in the indicating means by the first mentioned rectifier; while Figure 2 is a curve illustrating the operation of the arrangement of Figure 3.

Referring to Figure 1, 10 is a diode rectifier having its anode A connected to one terminal of a pair of input terminals on which alternating current energy from any source to be rectified may be impressed. The other terminal of the input is connected to the cathode K. The connection to the anode may include a coupling condenser 1 while the connection to the cathode may include a coupling and blocking condenser 3. An impedance 2 is connected as shown to the anode A and to a plurality of contacts. Resistances 4 and 5 of different value may be connected between the contacts and one terminal of 2. A current indicating means such as a microammeter is connected by a switch S to a selected one of contacts at one terminal and to the cathode K at the other terminal. This circuit permits the indicating means 6 to be connected in series with 2 and with the impedance between A and K directly or by way of resistances 4 and 5 of different value.

The microammeter 6 indicates rectified current and may be calibrated to indicate in terms of alternating current input voltage impressed on the input terminals to the diode. An additional rectifier 11 has its anode A' and cathode K' connected by a variable resistance 8 and leads L₁ and L₂ to the microammeter 6. It is noted that the electrodes A' and K' are connected to 6 in such a manner that residual current produced by rectifier 11 flows through 6 in a direction opposed to the direction of flow of residual current produced in 6 by 10. In other words, the connections of 10 and 11 to the indicating circuit including indicator 6, are opposed. By adjusting resistance 8 the residual current of diode 11 is caused to substantially exactly counter-balance the residual current of diode 10 and the meter 6 so that the microammeter 6 will read zero when there is no alternating current input impressed on the diode 10. The cathodes K and K' may be directly heated or be heated by a separate heating circuit HS connected as shown. My invention is applicable to the radio art in general. For example, my invention is applicable to a diode detector used in a wave receiver operating at any frequency. The use of my invention in a radio receiver circuit has been illustrated in Figure 3. In Figure 3 the diodes and their electrodes and heating circuit have been given numbers and letters corresponding to those used in Figure 1 and operate in the same manner. In Figure 3, however, the variable resistance 8 has been omitted as has the meter 6 and resistors 4 and 5. Wave energy to be demodulated is supplied at the terminals marked "Input", amplified in a radio frequency amplifier 12, coupled by 13 to the tuned input circuit of diode 10 which tuned input circuit now replaces in part the input circuit of Figure 1. A coupling condenser 16 is included in this input circuit and an impedance 17 is connected as shown in shunt to 16. The output of the system may be derived from a coupling condenser 18 and supplied to any utilization circuit such as indicating means of the audio frequency or video frequency type either directly or by way of additional amplifiers. Normally in detectors such as 10 there is direct current in the load circuit, that is, in 17 and the output of 17 through 18 even when no signal is applied to the input at 12. This is indicated by the curve A in Figure 2. As will be noted the rectified output of 11 opposes in 17 the rectified output of 10 and by adding this counter-balancing diode 11 the zero input residual current from 10 is reduced to zero by the counter-balancing residual current from 11. This reduction of the output of 10 to zero in the presence of zero input has been shown by a curve B in Figure 2. This reduction to zero of the voltage or current supplied by the rectifier in the presence of zero of substantially zero alternating current input is a desirable characteristic because it results in less distortion of the signal when operated with a high percentage of operation as is customary practice in broadcasting and telephony and the allied radio arts.

The two diodes 10 and 11 may be constructed in a common envelope such as in the case of the tube designated type RCA—6H6. There may also be separate diodes in separate envelopes as shown in the drawing.

I claim:

1. In a system for producing an accurate indication of wave energy amplitude, a rectifier, means for impressing wave energy on said rectifier, current intensity responsive means connected with said rectifier for producing indications of the intensity of the current resulting from rectification of said wave energy in said rectifier, and a rectifier similar to said first rectifier for producing in said current intensity responsive means current which opposes and is substantially equal to the current in said current intensity responsive means when the wave energy impressed on said first rectifier is substantially of zero amplitude.

2. In a demodulation system, a rectifier having an anode and a cathode, an impedance connected between said anode and cathode, means for impressing wave energy to be rectified on said impedance, an indicating device, a circuit connecting said indicating device between said anode and cathode for producing indications of the intensity of the current flowing between said anode and cathode when wave energy is impressed on said first named impedance, and a second rectifier similar to said first rectifier for producing a current flow in said indicating means in an opposite direction with respect to said aforesaid current flow and of an intensity sufficient to oppose and cancel current produced in said indicating means by said rectifier in the presence of wave energy of substantially zero amplitude.

3. In a demodulation system, a diode rectifier having an anode and a cathode, an impedance connected between said anode and cathode, means for impressing wave energy to be rectified on said impedance, an indicating device, a circuit including contacts cooperating with resistances of different value for connecting said indicating device and a selected resistance between said anode and cathode for producing indications of the intensity of the current flowing between said anode and cathode when wave energy is impressed on said first named impedance, a second rectifier and a circuit connecting said second rectifier with said indicating means for producing a current flow in said indicating means in an opposite direction to said aforesaid current flow and of an intensity substantially sufficient to oppose the current produced by said first rectifier in said indicating means in the presence of wave energy of substantially zero amplitude.

4. In a wave energy translating system, a pair of diode rectifiers each having an anode and a cathode, an output circuit, means connecting the anode and cathode of each of said diodes to said output circuit, the polarity of said connections being such that the currents produced in said diodes oppose in said output circuit, and means for impressing wave energy to be translated on the anode and cathode of one of said diode rectifiers only.

5. In a wave translating system, a pair of rectifiers each having electrodes including a cathode, an output circuit, means connecting the cathode of one of said rectifiers to one terminal of said output circuit and the cathode of the other of said rectifiers to the other terminal of said output circuit, means connecting a second electrode in said one rectifier to said other terminal of said output circuit and the other electrode of the other of said rectifiers to said one terminal of said output circuit whereby currents flowing in said rectifiers oppose in said output circuit, said rectifiers and connections being such that the opposing currents are substantially equal and ineffective in said output circuit in the absence of wave energy to be translated, and means for impressing wave energy to be translated on electrodes in one of said rectifiers only.

HAROLD O. PETERSON.